(12) United States Patent
Gezel et al.

(10) Patent No.: US 8,110,934 B2
(45) Date of Patent: Feb. 7, 2012

(54) PORTABLE ELECTRICITY GENERATOR

(76) Inventors: Joe Gezel, Indianola, IA (US); Brad Ross, Indianola, IA (US)

(*) Notice: Subject to any disclaimer, the term of this patent is extended or adjusted under 35 U.S.C. 154(b) by 323 days.

(21) Appl. No.: 12/472,677

(22) Filed: May 27, 2009

(65) Prior Publication Data

US 2009/0295171 A1 Dec. 3, 2009

Related U.S. Application Data

(60) Provisional application No. 61/056,274, filed on May 27, 2008.

(51) Int. Cl.
*H02P 9/04* (2006.01)
(52) U.S. Cl. ...................................................... 290/1 R
(58) Field of Classification Search .................. 290/1 R, 290/1 C, 1 D, 4 A, 4 R; 180/65.3, 2.1, 2.2, 180/165, 65.31
See application file for complete search history.

(56) References Cited

U.S. PATENT DOCUMENTS

| 6,359,344 | B1 | 3/2002 | Klein et al. |
| 6,603,227 | B2 | 8/2003 | Rose, Sr. |
| 6,987,328 | B2 | 1/2006 | Osborne |
| 7,135,785 | B2 * | 11/2006 | Kropp et al. ............... 290/40 C |
| 7,264,069 | B2 | 9/2007 | Fiorenza et al. |
| 2003/0181288 | A1 * | 9/2003 | Phillippe .......................... 477/7 |
| 2004/0239118 | A1 * | 12/2004 | Peng ............................ 290/1 R |
| 2007/0252457 | A1 * | 11/2007 | Vasilovich et al. ......... 310/75 R |

\* cited by examiner

*Primary Examiner* — Tho D Ta
(74) *Attorney, Agent, or Firm* — McKee, Voorhees & Sease, P.L.C.

(57) ABSTRACT

An apparatus for producing electricity includes an elongated body and an electricity generating device operatively connected to the elongated body. A drive shaft is positioned along the elongated body, the drive shaft having an input and an output. A driven shaft is positioned along the elongated body and spaced apart from the drive shaft, the driven shaft having an input and an output, the output driving the electricity generating device. There is a first mechanical linkage between the drive shaft and the driven shaft. A method of producing electricity includes positioning a combustion engine powered vehicle over at least a portion of the apparatus, mechanically linking an output shaft of the combustion engine powered device to the input of the drive shaft, and powering the electricity generating device with the combustion engine powered vehicle.

20 Claims, 7 Drawing Sheets

PORTABLE ELECTRICITY GENERATOR

CROSS REFERENCE TO RELATED APPLICATIONS

This application claims priority from U.S. Provisional Patent Application Ser. No. 61/056,274 filed May 27, 2008, the contents of which are incorporated herein by reference.

BACKGROUND OF THE INVENTION

The present invention relates to the production of electricity from a mechanical source. More particularly, the present invention relates to a portable electricity generator.

The production of electricity in emergencies or in remote locations is a common problem for residential and agricultural settings. The portable electricity generator allows the user to produce electricity for his entire home, church, community building or other structure or building during a power outage, or deliver electricity to a remote location not reached by the local electricity provider.

One problem with portable generators is that they typically are used relatively infrequently. A portable generator with an attached combustion engine may sit for a year or more without being used. A typical consumer tends to not routinely run the generator and maintain it. This infrequent use increases the likelihood that the generator will not properly operate when it is actually needed.

In order to produce electricity, the current state of the art portable generator requires an internalized mechanical drive to be transported along with the electricity generator. This adds weight and makes the generator difficult to transport and requires more storage space. The portable generator may also be prohibitively expensive for many consumers.

Thus, it is a primary object, feature, or advantage of the present invention to improve upon the state of the art.

It is a further object, feature, or advantage of the present invention is to use an existing power source to produce electricity or other work.

It is a still further object, feature, or advantage of the present invention is to provide a generator or other rotary-powered device which is dependable.

A further object, feature, or advantage of the present invention is to provide a device that is compact and convenient to move or transport.

Another object, feature, or advantage of the present invention is to provide a device which is inexpensive to manufacture.

Yet another object, feature, or advantage of the present invention is to provide a device which is easy for a customer to use.

A still further object, feature, or advantage of the present invention is to provide a device for generating electricity or other rotary-powered work which leverages existing assets of a consumer to reduce the cost and increase the effectiveness of generating electricity or other rotary-powered work.

One or more of these and/or other objects, features or advantages of the present invention will become apparent from the specification and claims. No single embodiment of the present invention need provide all of these specific objects, feature, or advantages. The present invention is not to be limited to or by these objects, features, or advantages.

BRIEF SUMMARY OF THE INVENTION

According to one aspect of the present invention, an apparatus for producing electricity is provided. The apparatus includes an elongated body and an electricity generating device operatively connected to the elongated body. A drive shaft is positioned along the elongated body, the drive shaft having an input and an output. A driven shaft is positioned along the elongated body and spaced apart from the drive shaft, the driven shaft having an input and output, the output driving the electricity generating device. There is a first mechanical linkage between the drive shaft and the driven shaft.

According to another aspect of the present invention, an apparatus for producing electricity using a combustion engine powered vehicle is provided. The apparatus includes an elongated deck and an electricity generating device capable of generating electricity, the electricity generating device operatively connected to the elongated deck. There is a driven shaft adapted to receive mechanical input, the driven shaft extending from said electricity generating device to underneath the deck. There is a drive shaft with a first pulley placed above the deck operatively and on drive shaft and a second pulley placed underneath the deck and on the drive shaft, wherein the pulley is configured to be driven by a belt driven by an output shaft of the combustion engine powered vehicle. There is at least one belt underneath the elongated deck to transfer mechanical force from the second pulley to thereby drive the driven shaft of the electricity generating device.

According to another aspect of the invention, a method of generating electricity is provided. The method includes providing a device comprising (a) an elongated body, (b) an electricity generating device operatively connected to the elongated body, (c) a drive shaft positioned along the elongated body, the drive shaft having an input and an output, (d) a driven shaft positioned along the elongated body and spaced apart from the drive shaft, the driven shaft having an input and output, the output driving the electricity generating device, and (e) a first mechanical linkage between the drive shaft and the driven shaft. The method further includes positioning the combustion engine powered vehicle over at least a portion of the device and mechanically linking an output shaft of the combustion engine powered device to the input of the drive shaft, and powering the electricity generating device with the combustion engine powered vehicle.

DETAILED DESCRIPTION OF THE PREFERRED EMBODIMENT

The present invention relates to an electricity producing device which may be used with a device such as, but not limited to, a lawn mower or a lawn tractor which has an output shaft capable of delivering rotary force. The output shaft may be, but need not have a belt-driven configuration. In the case of a lawn tractor or lawn mower, it is preferred that the lawn tractor or lawn mower have a belt-driven mower. Instead of driving a mower, the lawn tractor or lawn mower may be used to drive an input of the present invention to power a generator. This is advantageous because it allows one with a lawn tractor, zero radius turn mower, or other type of mower or other device to drive a generator.

Figure 1:
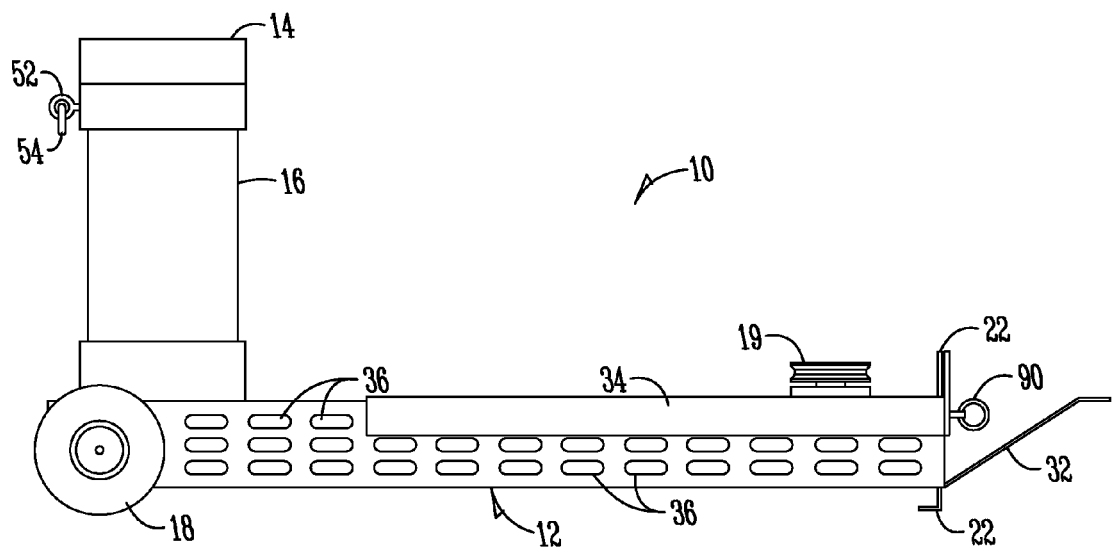
FIG. 1 is a side view of one embodiment of the present invention.

FIG. 1 illustrates a front view of one embodiment of the apparatus or device 10 of the present invention. The apparatus 10 has an elongated body such as a deck 12 which provides support for a housing 14 which encloses a generator 16. One or more wheels 18 are operatively connected to the deck 12. Also shown in FIG. 1 is a jack shaft or drive shaft 20. The shaft 20 may be driven by a belt associated with a lawn tractor, mower, or other device. As shown in FIG. 1 a pulley 19 is positioned on top of the elongated deck and provides an input to the shaft 20. Device 16 could, alternatively, be another device that is powered by rotary input such as shaft 23. A few non-inclusive examples which are: trash pump, hydraulic motor, and a blower.

Although the present invention is not limited to particular sizes, one example of a size which may be used is a main deck with a length of approximately 56 inches, a width of approximately 16 inches and a height of approximately 4 inches. In addition, the deck 12 may be made from a single piece of metal. Of course, the deck 12 may be made from any number of types of materials. Note that there are apertures 36 along the side of the deck 12. The apertures 36 allow for venting and also reduce the amount of material used in the deck 12 and thus the weight of the apparatus 10. In addition, the apertures 36 may be used as anchor holes for straps which may be used to further secure the axle of a lawn tractor or other vehicle to the device 10. The straps may be pull straps or ratchet straps; of course other types of straps or cords may be used. In addition, the lawn tractor or other device may be otherwise connected to the deck 12. Also shown in FIG. 1 is a safety leg 22 which may be positioned on the bottom side of the deck 12, to elevate the deck 12 off of the ground. The safety leg 22 can be secured with a removable quick-release ball lock pin 90 or analogous means through hole 92 of the protective shield 34 and hole 96 of safety leg 22. FIG. 1 also shows an eyelet 52 which may be used to support a grounding rod 54.

Figure 2:
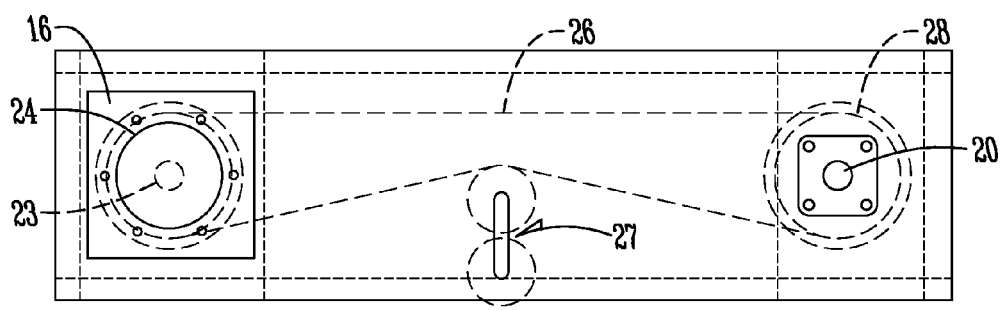
FIG. 2 is a top view of the embodiment shown in FIG. 1.

FIG. 2 is a top view of the device 10. In FIG. 2, the shaft 20 has an output pulley 28. There is a mechanical linkage, such as a belt 26 between the output pulley 28 of the drive shaft 20 and a pulley 24 which serves as an input on the shaft 23 of the generator 16. The belt 26 is driven by pulley 28 to drive pulley 24 associated with a shaft 23 of the generator 16. In this manner, a device such as a lawn tractor may ultimately drive a generator 16. The present invention contemplates that a spring tension or other type of belt tensioner 27 may be used if needed to apply tension to the drive belt 26. In addition, the present invention contemplates that different ratios between pulleys may be used, the ratio need not be 1:1. Although a belt is shown in FIG. 2, the present invention contemplates that other types of mechanical linkages may be used, such as a chain instead of a belt. Although pulleys are shown on the shafts, the present invention contemplates that other configurations may be used as may appropriate for a particular type of mechanical linkage.

Figure 3:
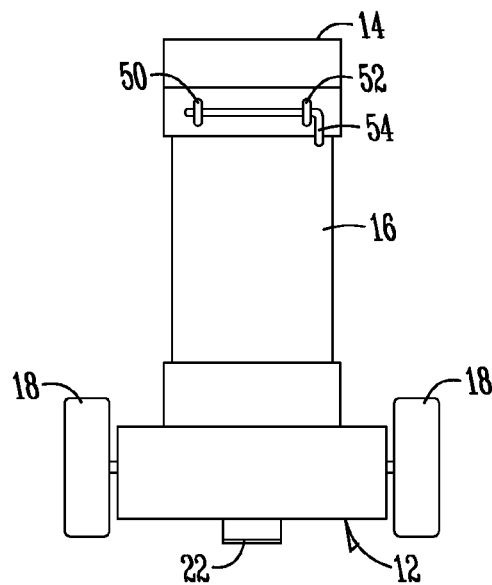
FIG. 3 is an end view of the embodiment shown in FIGS. 1-2.

FIG. 3 shows an end view of the device 10. Note that there are eyelets 50, 52 shown which support a ground rod 54. This configuration provides a convenient place to store the ground rod 54 when not in use. Although a ground rod is shown, the present invention contemplates that any number of methods of grounding the device may be used. Where a ground rod is provided and supported on the device 10 when not in use, the present invention contemplates any number of ways of supporting the ground rod. The ground may also be pinned in place to secure the ground rod 54 in place during transport of the device.

Figure 4A:
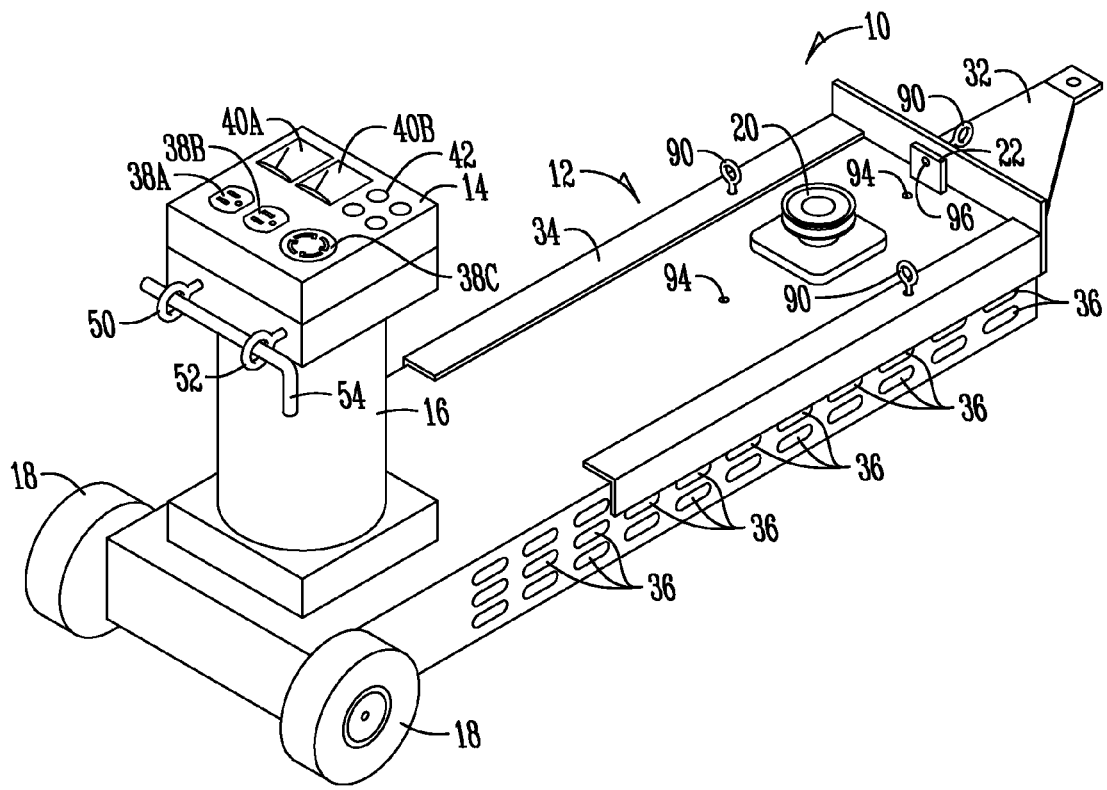
FIG. 4A is a perspective view of the embodiment shown in FIGS. 1-3.

FIG. 4A shows a perspective view of the device 10. The housing 14 of the generator 16 includes two 110V AC outlets 38A, 38B. A 220VAC outlet 38C is also shown. Voltmeters 40A, 40B, may also be provided to monitor voltage levels. Breaker switches 42 are also shown. In addition, an optional power inverter may be used to provide DC power. The generator 16 may be of various sizes. However, it is contemplated that because a lawn tractor or other device is used, the generator can be relatively large in size, including sizes such as 4000-12000 watts. Note that this is generally larger than many commercial/emergency standalone generators. A lawn tractor device with an 8-30 HP motor or more is sufficient to drive such a generator.

Figure 4B:
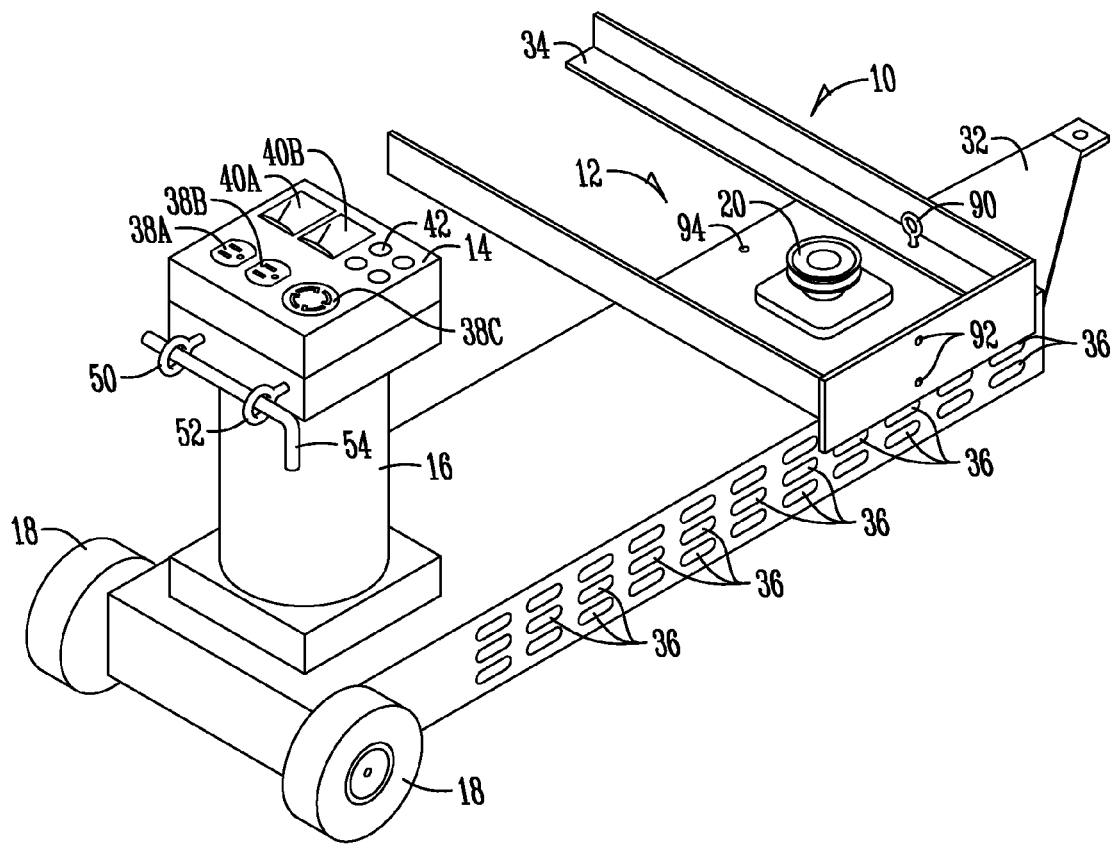
FIG. 4B is a perspective view of the embodiment shown in FIGS. 1-3 with a safety shield in an operative position.
Figure 5A:
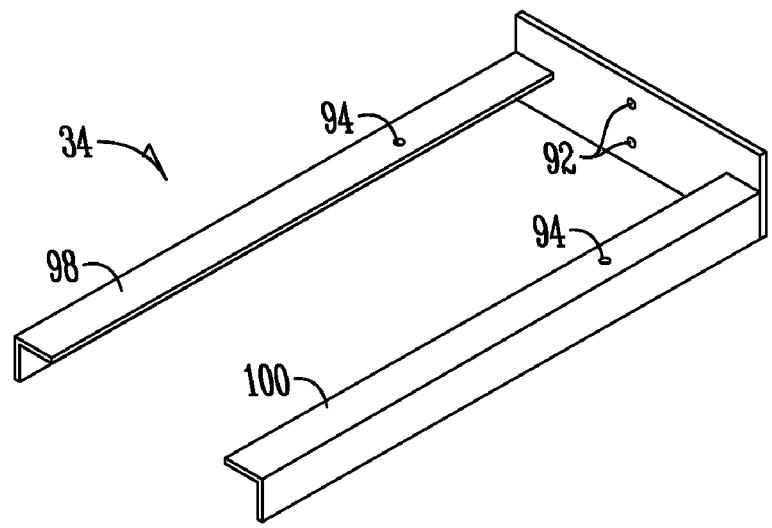
FIG. 5A is an isolated perspective view of the protective shield shown in FIG. 4A
Figure 5B:
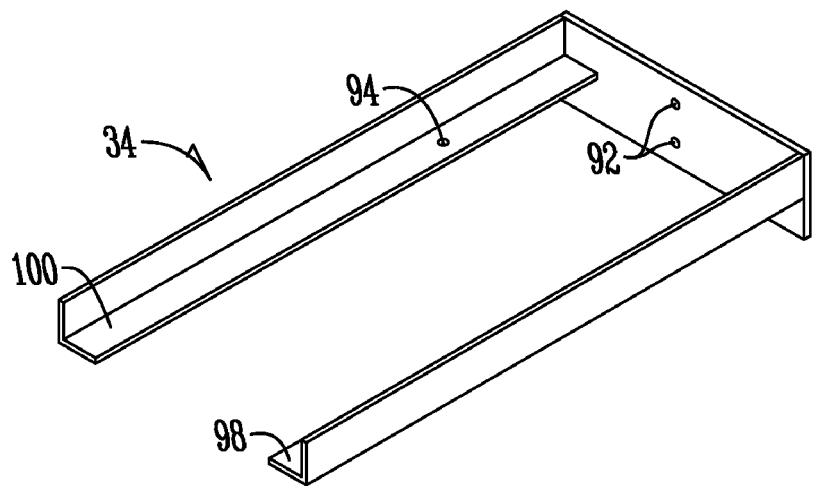
FIG. 5B is an isolated perspective view of the protective shield shown in FIG. 4B.
Figure 6:
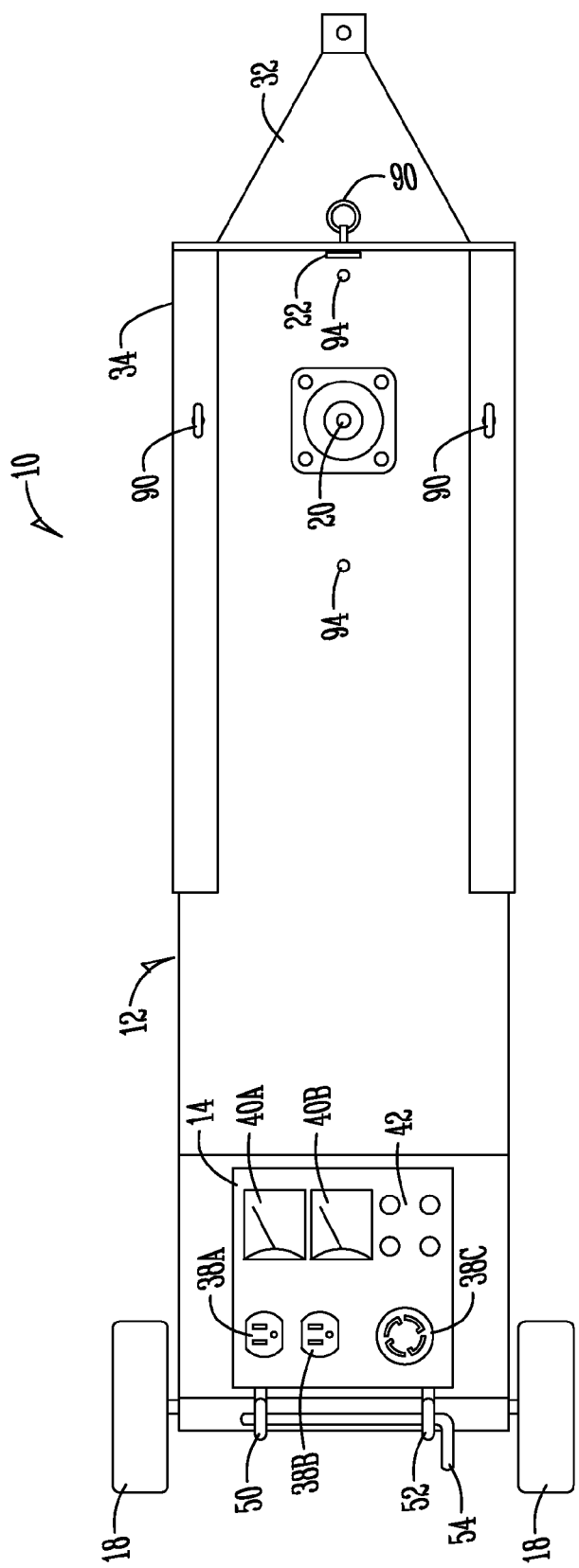
FIG. 6 is another top view of the embodiment shown in FIGS. 1-4.

Also shown in FIG. 4A, is a protective shield 34 which is shown in a stored or transport position. The protective shield 34 can also be seen in isolation in FIG. 5A which shows rails 98 and 100 with the vertical L-shaped portion extending downward. The protective shield 34 may be used to further protect a user against inadvertent contact with a moving pulley 20 by rolling it over 180 degrees and attaching at 90 degrees to the longitudinal axis of apparatus 10, refer to FIG. 4B, to allow placement under a mower 60, 80 from either side. The protective shield is secured to the deck 12 with ball lock pins 90 or analogous means through holes 94. The protective shield 34 can also be seen in isolation in FIG. 5B which shows rails 98 and 100 with the vertical L-shaped portion extending upward. A neck 32 extends from the deck 12. Thus, the device 10 may be towed behind a lawn tractor, mower, or other device. Although the neck as shown extends from the protective shield 34, the neck could extend from the bottom or front or sides of the deck 12. In addition, although a protective shield is shown, the present invention contemplates that a safety shield need not be used. FIG. 6 provides a top view of the device with the protective shield 34 in the stored or transport position.

Figure 7:
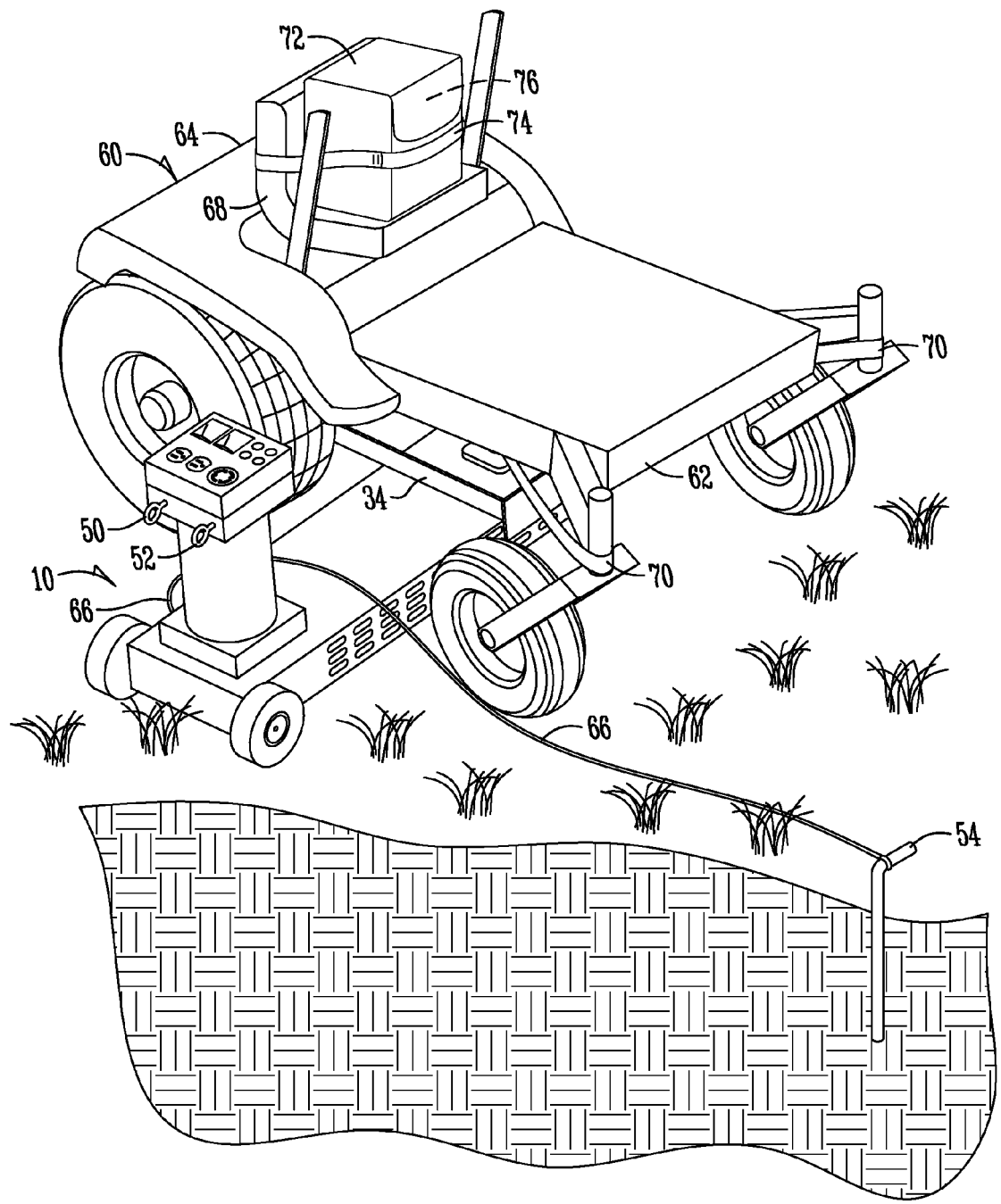
FIG. 7 is a perspective view of the embodiment of FIGS. 1-6 in use with a zero radius turn mower.

FIG. 7 illustrates a zero-radius turn mower 60 which can be used with the apparatus 10. The mower 60 has a front end 62 and a back end 64. Note that the apparatus 10 is positioned at the front of the mower 60, but could be placed elsewhere such as the side of the mower 60. There is a seat 68 on the mower 60. A weight 72 which may be formed from a bag filled with rock, sand, or other material 76 is secured to the seat 68 with a cord or strap 74. Some types of mowers 60 may have a sensor which prevents activation of the mower drive unless a weight is present indicating someone is sitting on the bag. To use these types of mowers, the weight 72 allows the belt to drive the generator even without anyone sitting on the mower seat 68. Of course, since the belt is driving a generator and not mower blades, there is not the safety concerns associated with mower blades present.

As also shown in FIG. 7, the generator 16 is electrically grounded by connecting a grounding wire 66 to the grounding rod 54 which may be earth grounded by placing in soil. Of course, other types of grounding may be performed as well.

Note also in FIG. 7 that straps 70 are used to secure the device 10 to the mower 60. It is to be understood that the mower 60 may vibrate some when in use, thus straps 70 may help prevent displacement of the device 10 from the mower 60.

Figure 8:
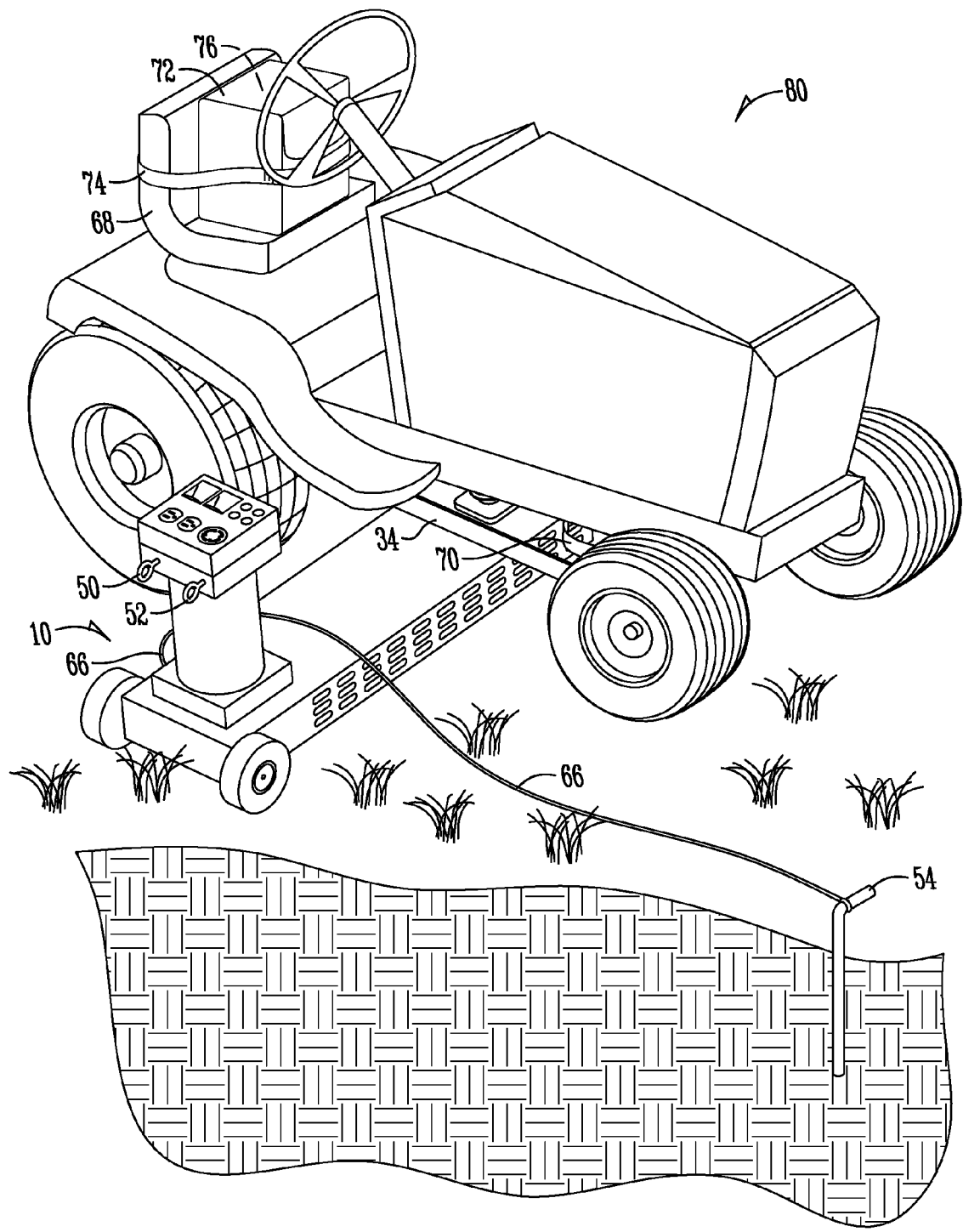
FIG. 8 is a perspective view of the embodiment of FIGS. 1-6 in use with a lawn tractor.

FIG. 8 illustrates a lawn tractor 80 used with the apparatus 10. As shown in FIG. 8, the apparatus 10 is on the side of the lawn tractor. Straps 70 are shown which secure the apparatus 10 to the lawn tractor. In addition, the grounding rod 54 is attached by a wire 66 to the generator to provide an earth ground.

Note although a zero turn radius mower and a lawn tractor are shown, other types of self-propelled vehicles may be used, including skid steer loaders. In addition, depending upon the size and type of vehicle, instead of backing the vehicle on to the device 10, the vehicle may be driven forward onto the device. In addition, the vehicle may have a PTO which may be used to drive the jackshaft of the device 10. Also, although the lawn tractor 40 shown is adapted for use with a belt-driven mower, the present invention contemplates other embodiments such as use of an orbital drive of a skid steer loader. A hydraulic driven system may be used to drive the generator.

The present invention further contemplates that a handle may be attached and used to assist in transporting the apparatus 10. Alternatively, the apparatus may be towed. The apparatus itself is compact and easy to store, such as in the corner of one's garage. It may be placed in an upright position so as to take up a limited amount of floor space. The present invention contemplates that the device 10 may be easy to manufacture and to ship from factory or distributor to a consumer. The present invention contemplates that the device 10 without the generator may be shipped from one location to a consumer and the generator may be shipped from another location to a consumer. The device 10 is preferably easy to assemble by the consumer. Of course, the device 10 may also be sold as a fully assembled device through retail distribution channels. The present invention may be particularly useful in emergency situations caused by widespread loss of power, as the present invention would be relatively easy to distribute.

It should be recognized that the device 10 fits numerous sizes, types, and styles of lawn tractors and other vehicles. For example, the vehicle may be a rear-driven vehicle or a front driven vehicle such as a car or truck, with a tire removed and a pulley used instead. An adjustable screw jack may be used to tension the belts between the axle and the deck. The generator may be placed horizontally with the axle if desirable or a PTO may be used. A wide variety of external sources may be used to drive the electricity generator. For example, including a hydraulic-driven device. Thus, for example, hydraulics such as from agricultural or construction equipment may be used to drive the jackshaft 20.

Therefore, an apparatus has been described for producing electricity. Although specific embodiments have been described herein, the present invention is not to be limited to the specific description provided as the present invention contemplates numerous variations, options, and alternatives such as the in the size, configuration, type of materials, type of driving device (such as belt-driven, chain-driven or hydraulic-driven) or other variations which require a rotary-power source.

What is claimed is:

1. An apparatus for producing electricity, the apparatus comprising:
    an elongated body;
    an electricity generating device operatively connected to the elongated body;
    a drive shaft positioned along the elongated body, the drive shaft having an input and an output;
    a driven shaft positioned along the elongated body and spaced apart from the drive shaft, the driven shaft having an input and an output, the output driving the electricity generating device;
    a first mechanical linkage between the drive shaft and the driven shaft; and
    a protective shield operatively connected to the elongated body, the protective shield movable between a stored position against the elongated body and a protecting position extending at least partially away from the elongated body.

2. The apparatus of claim 1 wherein the first mechanical linkage being positioned underneath the elongated body.

3. The apparatus of claim 2 wherein the elongated body is a deck.

4. The apparatus of claim 3 wherein the first mechanical linkage comprises a belt.

5. The apparatus of claim 4 wherein an output of a combustion engine vehicle is operably connected to the input of the drive shaft such that the combustion engine vehicle powers the electricity generating device.

6. The apparatus of claim 5 wherein the combustion engine powered vehicle is a lawn tractor.

7. The apparatus of claim 5 wherein the combustion engine powered vehicle is a lawn mower.

8. The apparatus of claim 4 further comprising a first pulley on the input of the drive shaft, a second pulley on the output of the drive shaft.

9. The apparatus of claim 8 further comprising a first wheel and a second wheel operatively connected to the elongated body.

10. An apparatus for producing electricity using a combustion engine powered vehicle, the apparatus comprising:
    an elongated deck;
    an electricity generating device capable of generating electricity, the electricity generating device operatively connected to the elongated deck;
    a driven shaft adapted to receive mechanical input, the driven shaft extending from said electricity generating device to underneath the deck;
    a drive shaft;
    a first pulley placed above the deck operatively and on the drive shaft;
    a second pulley placed underneath the deck and on the drive shaft, wherein the first pulley is configured to be driven by a belt driven by an output shaft of the combustion engine powered vehicle;
    at least one belt underneath the elongated deck to transfer mechanical force from the second pulley to thereby drive the driven shaft of the electricity generating device.

11. The apparatus of claim 10 wherein the combustion engine powered vehicle is a lawn tractor.

12. The apparatus of claim 10 wherein the combustion engine powered vehicle is a lawn mower.

13. The apparatus of claim 10 further comprising a first wheel and a second wheel operatively connected to the elongated deck.

14. The apparatus of claim 13 further comprising a hitch operatively connected to the elongated deck.

15. The apparatus of claim 14 further comprising a protective shield proximate the first pulley on the top of the elongated deck.

16. A method of generating electricity, comprising:
    providing an apparatus comprising (a) an elongated body, (b) an electricity generating device operatively connected to the elongated body, (c) a drive shaft positioned along the elongated body, the drive shaft having an input and an output, (d) a driven shaft positioned along the elongated body and spaced apart from the drive shaft, the driven shaft having an input and an output, the output driving the electricity generating device, (e) a first mechanical linkage between the drive shaft and the driven shaft and (f) a protective shield operatively connected to the elongated body;

moving the protective shield to a protecting position wherein the shield extends at least partially from the elongated body;

positioning a combustion engine powered vehicle over at least a portion of the apparatus and mechanically linking an output shaft of the combustion engine powered vehicle to the input of the drive shaft; and powering the electricity generating device with the combustion engine powered vehicle.

17. The method of claim 16 further comprising grounding the electricity generating device.

18. The method of claim 16 further comprising placing a weight on a seat of the combustion engine powered vehicle.

19. The method of claim 18 further comprising securing the weight to the seat of the combustion engine powered vehicle.

20. The method of claim 16 further comprising securing the device to the combustion engine powered vehicle.

* * * * *